Patented June 9, 1936

2,043,254

UNITED STATES PATENT OFFICE 2,043,254

TREATMENT OF HYDROCARBON OIL

William M. Malisoff, Philadelphia, Pa., assignor to The Atlantic Refining Company, Philadelphia, Pa., a corporation of Pennsylvania No Drawing. Application April 7, 1932, Serial No. 603,899

3 Claims. (Cl. 196—32)

The present invention relates to the art of refining petroleum oils and has particular reference to a process for freeing petroleum and its products of unstable or sludge-forming components.

As disclosed in my copending application Serial No. 493,064, filed Nov. 3, 1930, of which the present application is a continuation in part, I have found that sulphur compounds, particularly mercaptan sulphur, can be removed from an oil by treatment with certain organic solvents having an alkali dissolved therein. In accordance with the present invention, such caustic solvent treatment is of special advantage when combined with a sludging treatment, the caustic solvent treatment to precede treatment with a sludge-forming agent.

Petroleum fractions, especially those obtained from crudes of asphaltic or mixed base type, contain appreciable amounts of impurities, the removal of which is necessary in the production of a suitable marketable product of good stability.

Among the undesirable materials which are ordinarily removed during acid treatment, diolefines and sulphur compounds are of particular importance. When an oil containing these materials is treated with a sludge-forming agent, for example, sulphuric acid, without preliminary treatment which in accordance with my invention precedes the treatment with a sludge-forming agent, condensation reactions occur, which in addition to removing diolefines and sulphur, remove with the reaction products many desirable components of the oil apparently by some loose combination with the reaction products or by direct reaction with the acid, stimulated by the presence of the diolefines and/or sulphur compounds. Instead of first treating an oil directly with acid and/or other sludge-forming agent, my process provides for initially treating the oil with an alkaline organic solvent. The organic solvent may be one or a mixture of two or more materials from the group comprising monohydric alcohols, polyhydric alcohols, ketones, and halogen hydrins. More specifically, I have found it desirable to use methyl, ethyl, propyl, and isopropyl alcohols; glycols and glycerine; acetone, ethyl methyl ketone, and diethyl ketone; and epichlorhydrin. Of the substances named, methyl alcohol, ethyl alcohol, glycol, and glycerine are of particular utility as solvents. Sodium or potassium hydroxides, or other strong basic materials, are preferably employed to make up the alkaline or caustic component of my treating agent. Since it is necessary to free the oil from the treating solution in order to obtain a product suitable for subjection to a sludging agent treatment, it is essential that the organic solvent be of a type which may be satisfactorily separated from the oil. In many instances, the immiscibility of the treating solution and the oil is depended upon when separation of the two liquids is effected. In general, when oil miscible organic solvents within the classes or groups listed above are employed, the necessary immiscibility may be obtained by having an immiscible rendering substance present in the treating solution, and examples of such substances are water, inorganic salts, such as calcium nitrate, or even organic compounds such as urea. When an oil miscible solvent is employed, and when water is used to render the treating solution immiscible with the oil, it is desirable to confine the water content to only an amount sufficient to render the solution immiscible with the oil. Although, in general, it is possible to employ a treating solution containing 15% or sometimes even more of water, preferred results are obtained by employing a treating solution containing not more than substantially 10% of water. After treatment with a caustic solvent, a solution of sodium hydroxide in methanol, hereinafter referred to as caustic methanol, being a suitable and economical choice, the oil is next treated with a sludge-forming agent, preferably sulphuric acid. Hereinafter, for brevity the term caustic methanol, is used in a generic sense to embody said material or any other preliminary treating agent coming within the group or combination of one or more substances from groups above set forth, or equivalents thereof.

By such procedure I have found that a superior product may be obtained with a substantial saving in sludge-forming agent and with a substantial economy in loss of oil to the sludge, resulting also in a smaller quantity of sludge, and a minimization of the problem of handling the sludge. Also, when my product is to be employed as a motor fuel, the removal therefrom of desirable, non-detonating components is avoided. The caustic methanol wash or extraction appears (1) to remove the highly reactive unsaturated hydrocarbons, (2), to polymerize some oxygenated compounds such as aldehydes forming resins soluble in caustic methanol and removable therein (3) to remove certain reactive sulphur bodies principally mercaptans, and (4) to remove undesirable bodies such as acidic sulphur compounds. All of the above impurities removed are such as would, if present, consume sludge-forming agent in the subsequent treatment therewith; but perhaps more significant is the fact that the extraction of these impurities prior to the treatment aforesaid averts the heavy condensation losses which ordinarily accompany the removal of unstable materials by such treatment. The absence of these highly reactive materials also makes it feasible to use stronger acids, such as concentrated or fuming sulphuric acid the use of which in the presence of these undesirable impurities would be undesirable in view of the excessive polymerization or condensation of desirable constituents which would occur. In addition, my preliminary treatment, on subsequent treatment with acid or equivalent, results in the production of more fluid sludges, which because of their fluidity and other characteristics, are more readily settled and separated from acid than are the coky sludges which result from the usual acid treatment. This makes possible the recovery of acid in useful form and the more ready utilization of the tarry portion of the sludge.

The following examples are partly illustrative of the accomplishments of my invention. The comparisons made are on the basis of sulphur content, partly because of the lack of available determinative methods the results of which may be expressed in actual comparative units to show the important properties of percent gum-forming constituents present or percent color-imparting or other unstable constituents present, before and after treatment, and because in the case of petroleum distillates containing appreciable amounts of sulphur, the quantity of acid required for treatment is dictated by the sulphur reduction required or desired. In other words, when the sulphur content of such distillates is reduced by acid treatment to a satisfactorily low point, e. g. of the order of 0.1% or lower, the color, color stability, gum, and gum stability are found to be brought within satisfactory limits; accordingly, data on sulphur reduction is adjudged to be a good criterion of the improvements in other factors of concern.

*Example 1*

A cracked petroleum distillate containing 0.235% sulphur was divided into three equal parts and each part was refined to 0.1% sulphur by treatment with sulphuric acid preceded by one of three preliminary treatments, namely (1) caustic washing, (2) plumbite sweetening, and (3) caustic methanol washing, with the following comparative results:

1. Following the caustic wash, 7.0 pounds of 93% sulphuric acid were required to reduce the distillate to a sulphur content of 0.1%;
2. Following the plumbite treatment, 9.6 pounds of 93% sulphuric acid were required to bring the sulphur down to 0.1%;
3. While, following the caustic methanol wash, only 4.4 pounds of the same acid were required to reduce the distillate to the same sulphur content.

*Example 2 (comparing acid requirements on the same basis as in Example 1)*

A straight run naphtha having 0.35% sulphur was treated with fuming acid. For a final sulphur content of 0.1%, the acid consumptions varied as follows with the preliminary treatment employed:

1. The caustic washed fraction required 14.5 pounds of acid;
2. The sodium plumbite treated fraction required 9.0 pounds of acid; and
3. The same fraction washed with caustic methanol required only 6.0 pounds of acid.

In comparing oil losses, there was a saving of 0.5% of the oil treated with caustic methanol and subsequent acid treatment as compared with simply caustic washing plus subsequent acid treatment. These figures indicate a substantial oil saving and also serve to corroborate the data on saving in acid accomplished when caustic methanol is chosen as the preliminary treating agent.

There is only a very slight percentage reduction in the volume of oil due to my preliminary caustic methanol extraction, the quantity of oil constituents normally lost to the treating agent being of the order of 0.1% or less of the oil.

As illustrated by the following data, the combined effects of the caustic methanol treatment and subsequent acid treatment are not merely additive: For example, a cracked naphtha containing 0.22% sulphur required 11 pounds of 93% sulphuric acid to bring its sulphur content down to 0.1%. By giving the naphtha a preliminary caustic methanol treatment, its sulphur content was reduced to 0.19%. If the effects of my combined steps of treatment were additive only, there would be required $\frac{1}{11}$ of 11 pounds, or about 8.3 pounds of acid to bring the preliminarily caustic methanol treated distillate of 0.19% sulphur down to 0.1% sulphur. However, only 5 pounds of acid were actually required, clearly indicating the distinct saving in acid accomplished by the preliminary caustic methanol treatment over and above that due to actual removal of a portion of the sulphur. That is, by preceding the acid treatment by a caustic methanol treatment, the caustic methanol removes certain constituents which, if present during the acid treatment, would induce many undesirable polymerization, condensation and/or addition reactions with consequent loss of desirable oil components, for example, olefinic materials, and also with accompanying loss of acid and with the formation of a greater volume of sludge.

Summarily, my process produces refined oil fractions of desirable properties and of excellent stability without a substantial decrease in the quantity of the originally impure fraction treated. Further, it accomplishes a material saving in acid and the production of a fluid sludge from which the unconsumed acid is much more easily removable than in the case of ordinary coky sludges. Also, in the case of motor fuels, the removal of the undesirable gum-forming and color-imparting materials is accomplished with a minimum loss of the desirable non-detonation promoting ingredients.

Herein and in the appended claims the term, sludge-forming agent, means sulphuric acid, ferric chloride, or other like materials capable of producing a sludge with an oil containing impurities.

What I claim is:

1. In a process for refining hydrocarbon oil, the steps which comprise contacting the oil with an alcohol alkali solution, said solution containing sufficient water substantially to inhibit the mutual solubility of the solution and the oil, the amount of water present being less than substantially 15%, separating the oil from the alcoholic alkali solution and impurities absorbed therein, and treating the separated oil with a sludge-forming agent capable of forming with unstable constituents in such oil an easily removable fluid sludge.

2. In a process for refining hydrocarbon oil, the steps which comprise contacting the oil with a solution of caustic alkali in at least one substance from the group consisting of methyl alcohol, ethyl alcohol, propyl alcohol, isopropyl alcohol, glycol, glycerine, acetone, ethyl methyl ketone, diethyl ketone, and epichlorhydrin, said solution containing sufficient water substantially to inhibit the mutual solubility of the solution and the oil, the amount of water present being less than substantially 15%, thereafter separating said solution from the oil, and treating the oil with a sluge-forming agent capable of forming with unstable constituents of the oil an easily removable fluid sludge.

3. In the refining of a hydrocarbon oil, the steps which comprise washing the oil with an alcoholic solution of sodium hydroxide containing sufficient water substantially to inhibit the mutual solubility of said solution and the oil, the amount of water present being less than substantially 15%, separating the washed oil from the solution and impurties contained therein, and treating the separated oil with sulphuric acid.

WILLIAM M. MALISOFF.